March 31, 1964  M. WIESSNER ETAL  3,126,806
MIRROR CONTROL ARRANGEMENT FOR REFLEX CAMERAS
Filed Feb. 21, 1961  5 Sheets-Sheet 2

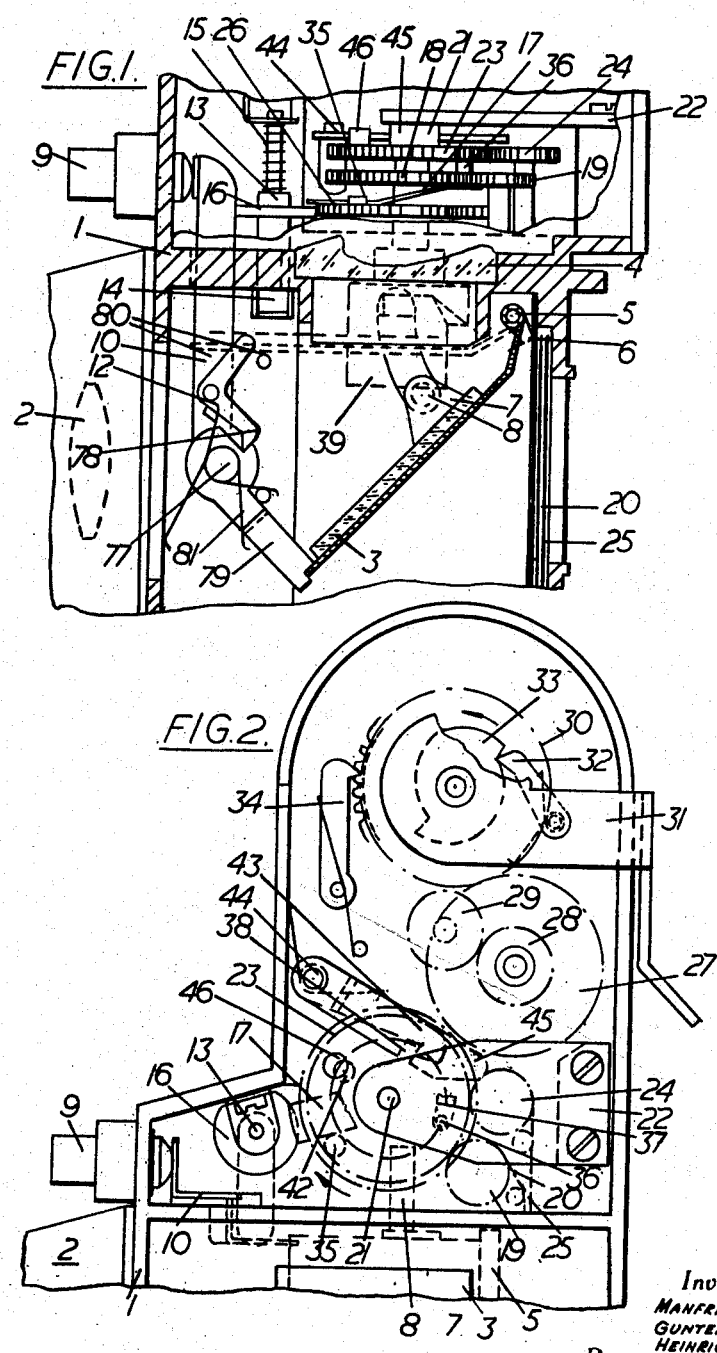

Inventors
MANFRED WIESSNER
GUNTER HEERKLOTZ
HEINRICH SKOLAUDE
By
Irwin S. Thompson
Attorney

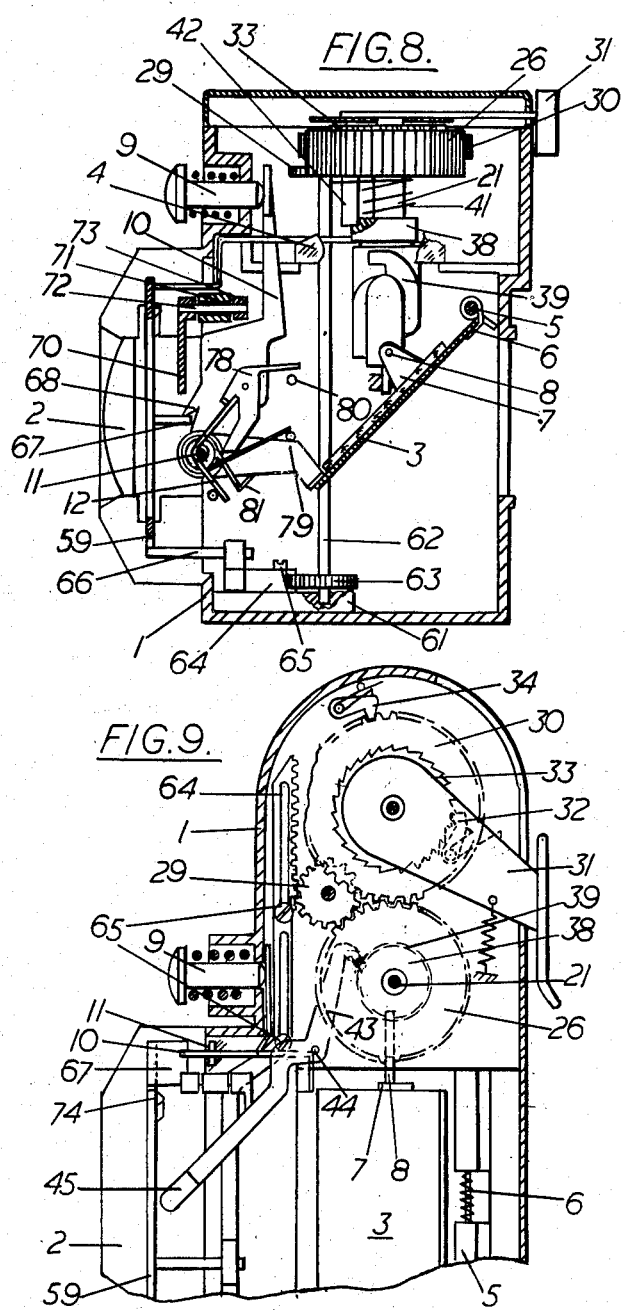

March 31, 1964     M. WIESSNER ETAL     3,126,806
MIRROR CONTROL ARRANGEMENT FOR REFLEX CAMERAS
Filed Feb. 21, 1961     5 Sheets-Sheet 5
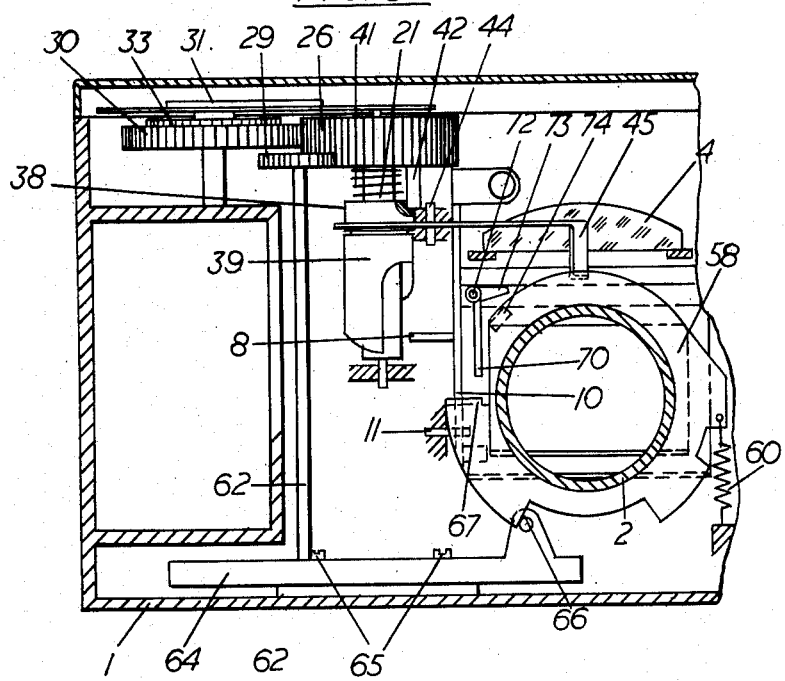
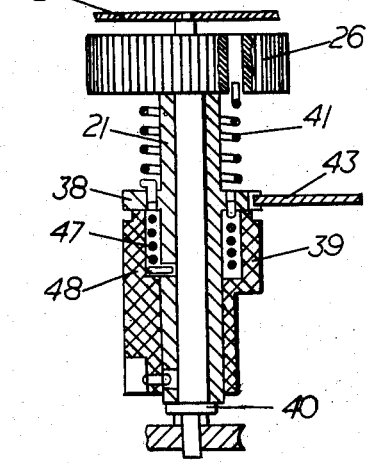
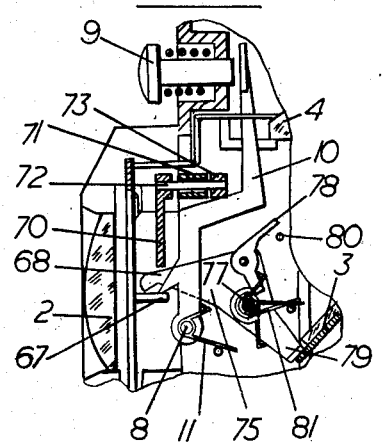
Inventors
MANFRED WIESSNER
GUNTER HEERKLOTZ
HEINRICH SKOLAUDE
By Irwin S. Thompson
Attorney

United States Patent Office 3,126,806
Patented Mar. 31, 1964

3,126,806
MIRROR CONTROL ARRANGEMENT FOR
REFLEX CAMERAS
Manfred Wiessner and Gunter Heerklotz, Dresden, and Heinrich Skolaude, Freital, Saxony, Germany, assignors to VEB Kamera- und Kinowerke Dresden, Dresden, Germany
Filed Feb. 21, 1961, Ser. No. 90,674
8 Claims. (Cl. 95—42)

The invention relates to an arrangement for the control of the mirror in monocular mirror reflex cameras having roller blind shutter or between-the-lens shutter. In such cameras it is already known to arrange in the space between the picture-taking objective lens and the film compartment for the layer-support to be exposed, for example the plate or film, a pivotably mounted mirror subject to spring action, which when in the reflex position, preferably set at 45 degress, reflects the ray path coming from the picture-taking objective lens to an optical view finder arrangement situated on the upper side of the camera. As a rule this arrangement here consists of a ground glass plate or picture area lens, with which there is associated an optical reversing system assembled from prisms and lenses, which permits a parallax-free viewing of the picture projected by the picture-taking objective lens, on the preferred scale of 1:1 or even in enlargement.

In order to render possible the exposure of the layer carrier, in the case of monocular mirror reflex cameras the mirror must first be moved out of the effective reflex or view finding position and completely out of the region of the objective lens ray path, so that this ray path can pass to the layer carrier without hindrance through the image aperture, whereupon after exposure has been effected the mirror is to be moved back into the view finding position again. While in the case of simple mirror reflex cameras in the cheap price range this mirror movement was controlled by hand in combination with the release, in the case of high-grade cameras arrangements are provided by which the mirror is released out of the reflex position through the release arrangement of the shutter or by the shutter running off itself, whereupon its return takes place through a cam and lever system in combination with the cocking gearing for the shutter and the film winding coupled therewith. This in fact achieves the advantage that the return of the mirror into the view finding position takes place automatically on cocking of the shutter with the film winding, but on the other hand this embodiment has the disadvantage that in the time between the release of the camera and the effecting of the cocking of the shutter no observation of the view finder picture is possible.

Now in the meantime monocular mirror reflex cameras have become known wherein the mirror is moved back into the view finding position immediately after the exposure of the layer carrier is effected, that is to say before the cocking of the shutter and the winding of the film take place. In such a camera, wherein a roller blind shutter is provided for the exposure, the mirror control takes place in a manner wherein the mirror is moved up out of the view finding position against the action of the return spring, by the release directly or by a spring mechanism released thereby through a lever linkage, and is blocked in this position by a lever which in turn is released on running off of the shutter, by the shutter gearing, whereupon the mirror returns into the view finding position due to the action of its return spring. A camera wherein the mirror movement is controlled through a lever system actuated by a spring mechanism, after the style of a planet wheel gearing, possesses the same effect.

In another camera wherein a between-the-lens shutter is provided for the exposure, the control of the mirror movement takes place through a rotating cam gearing driven by a spring mechanism, the spring mechanism being wound in the common cocking of the shutter and winding of the film. This cam gearing after its release in its rotation, apart from the closing of the shutter blades, the closure of the diaphragm to the pre-selected value and the release of the shutter, effects at the same time in the provided operating sequence also the control of the mirror in such fashion that the latter is moved against its return spring out of the view finding position and is returned into the view finding position again after the exposure of the layer carrier has been effected.

Apart from the considerable and complicated gearing expenditure necessary in the case of these known cameras, to these constructions the disadvantage is common that here the mirror has to be moved against the action of its return spring out of the view finding position. This embodiment thus necessitates a correspondingly stronger spring mechanism, which on the other hand has a harmful effect on the gearing and a delaying action upon the running off thereof. The arrangement of a common cam gearing for the actuation of all functions has the further disadvantage that considerable inertia forces thereby have to be overcome and the cams, accordingly set in a fixed ratio in relation to one another, must be adapted for the different functions to the longest exposure time. Accordingly, in the case of setting to shorter exposure times a corresponding delay takes place in the running off of the functions, which has an unfavourable effect also in the case of the taking of pictures of actions which have a rapid progress or of rapidly moved objects.

The invention is based upon the problem of providing a mirror control arrangement for monocular mirror reflex cameras with roller blind shutter or between-the-lens shutter, which is distinguished by an especially simple style of construction and at the same time avoids the stated disadvantages of the known mirror reflex cameras. This problem is substantially solved due to the fact that with a drive wheel coupled with the cocking gearing for the shutter and film winding there is associated coaxially a cam driven thereby by means of spring action and releasable by the shutter running off in combination with an operating disc, which cam returns the mirror, released from the view finding positions, which in turn releases the shutter, against the action of the mirror spring into the lockable view finding position and thereupon uncouples itself from the mirror.

In further development of the invention the cam returning the mirror into the view finding position can be provided with a catch by which the mirror is blocked in the hinged-up position and thereby a reliable halting thereof is achieved. Furthermore, the cam controlling the mirror can be constructed either as axially or as radially acting cam.

In all these possible embodiments the object is achieved that after release of the mirror out of the view finding position has been effected the mirror is moved without additional expenditure of force by its mirror spring out of the ray path of the objective lens, and at the same time releases the shutter, which in turn in the cases of all exposure times releases the cam for return of the mirror into the view finding position, immediately after exposure has been effected. Thus the mirror movement is so controlled in combination with the shutter that in its actuation—quite irrespective of the exposure time to which the shutter is set—no disadvantageous idle motion occurs, so that thus even the taking of pictures of rapidly occurring actions is rendered possible. Furthermore, the construction in accordance with the invention is here made such that it is usable with advantage both for monocular mirror reflex cameras having a roller blind shutter and for monocular mirror reflex cameras with between-the-lens shutter.

Preferred examples of embodiment of the invention are illustrated diagrammatically in the drawings, wherein all parts not appearing absolutely necessary for the understanding of the invention have been omitted.

FIGURES 1 to 7 relate to examples of embodiment of the invention in the case of monocular mirror reflex cameras having a roller blind shutter.

FIGURE 1 shows in lateral elevation and section a part of the camera, an axial curve being provided for the mirror control;

FIGURE 2 shows a plan view of the arrangement as illustrated in FIGURE 1;

Figure 3:
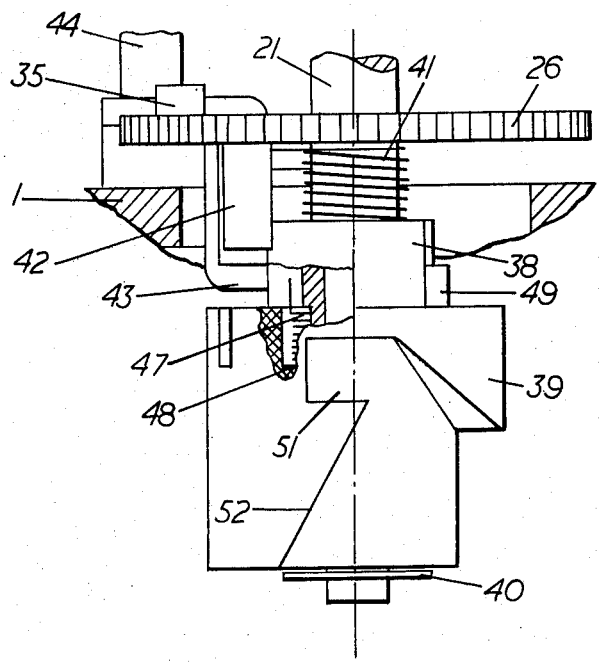
FIGURES 3 and 4 show in enlarged representation details of the mirror control arrangement.
Figure 4:
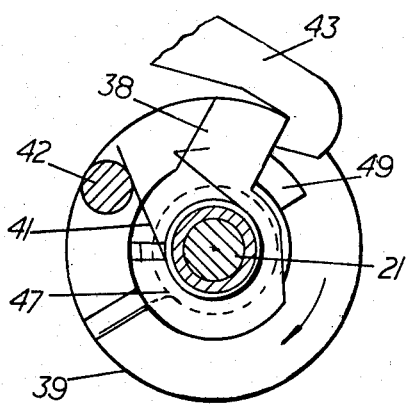

FIGURES 8 to 11 relate to an example of embodiment of the invention in the case of a monocular mirror reflex camera with between-the-lens shutter;

FIGURE 8 shows in the lateral elevation and section a part of the camera;

FIGURE 9 shows a plan view of this arrangement;

FIGURE 10 shows in section a front elevation of this arrangement;

FIGURE 11 shows an enlarged representation of the mirror control arrangement in section;

FIGURE 12 shows a further example of embodiment for the control of the mirror.

According to the examples of embodiment as illustrated in FIGURES 1 to 7, which relate to the arrangement of the mirror control for monocular mirror reflex cameras having a roller blind shutter, with the camera housing 1 there is associated the picture-taking objective lens 2, on the front, the ray path of which is deflected by the mirror 3 at right angles towards the picture area lens 4 only partially illustrated and situated in the upper part of the camera, for the viewing of the view finding image. The mirror 3 is mounted for pivoting about the spindle 5 and is subject to the action of the spring 6 held thereby, by which the mirror 3 is hinged out of the view finding position into the horizontal position, illustrated in chain lines, after its release. Laterally of the mirror 3 there is secured to a plate 7 a control pin 8, through which the return of the mirror 3 into the view finding position takes place in a manner described hereinafter. In this reflex position the mirror 3 is blocked by a two-armed release lever 10 actuated by the release knob 9 of the camera, which lever is movable about the mounting 11 and is moved by the spring 12 into the blocking position. After release has been effected by the released lever 10 the mirror 3 strikes against an angular part 14 connected with the shutter release pin 13 and moves the latter upwards against the action of the spring 15, this part thereby lifting out the shutter blocking spring 17, by means of its collar 16.

The spring 17 is secured to the shutter wheel 18, by which the roller for the first shutter 20 is driven, through a toothed pinion 19, which shutter clears the image aperture for exposure, after release has been effected. The shutter wheel 18 is mounted in loosely rotatable fashion about the stationary drive mechanism spindle 21, which is held on the one hand in the camera housing and on the other hand by the bearing 22 secured thereto. The shutter wheel 23 is rotatably mounted coaxially with the shutter wheel 18 and above the latter, and drives the roller for the second shutter 25, through a tooth pinion 24, which shutter closes the image aperture again after release has been effected. The cocking of the two shutter wheels 18, 23, and thus of the two shutters 20, 25, takes place through a drive wheel 26, similarly loosely rotatable about the drive mechanism spindle 21, which wheel through the intermediate wheels 27, 28, 29, 30 is connected with the operating handle 31, preferably constructed as rapid-cocking lever, and receives the drive in the operating movement thereof, through the free-wheel gearing consisting of the drive pawl 32 and ratchet wheel 33. Here the return movement of the drive wheels 26—30 is prevented by a locking pawl 34 subject to spring action and engaging in the toothed wheel. From the cocking gearing, for example from the intermediate wheel 28, the drive of the film winding roller (not shown) can take place.

In the cocking movement by the operating handle 31, through the described toothed wheel gearing, the film winding is effected and the cocking of the shutter is effected by the drive wheel 26. The drive wheel 26, which here is rotated in the direction of the indicated arrow, through its pin 35 which abuts on the spring 17 of the shutter wheel 18, here entrains the latter, which in turn by means of a drive pin 36 engages in an annular recess 37 of the shutter wheel 23 and thus moves the latter with it.

Beneath the drive wheel 26 there is arranged the arrangement for the control of the mirror return into the view finding position. As shown, especially by FIGURES 3 and 4, it consists of a locking disc 38 mounted rotatably about the drive mechanism spindle 21, by the bearing bush of which an axial helical cam 39 is rotatably held, both of which are secured axially by a disc 40. The blocking disc 38 is subject to the action of a torsion spring 41, which rests with its other arm on a pin 42 of the drive wheel 26 and seeks to rotate the blocking disc 38 on the drive mechanism spindle 21 in relation to the drive wheel 26. This however is firstly prevented by a blocking lever 43 subject to spring action and co-operating with the blocking disc 38, which lever is pivotable about the stationary pivot bolt 44 and possesses a further arm 45, which extends into the running-off path of a pin 46 secured on the shutter wheel 23. With the blocking disc 38 there is connected a further torsion spring 47, which lies in an annular recess 48 of the cam 39 and presses the latter by means of its drive member 49 constantly against the blocking disc 38.

The manner of operation of this control arrangement is as follows:

On actuation of the release knob 9 the mirror 3 is released out of the view finding position by the release lever 10, and is thereupon hinged up by the action of the spring 6 and at the end of this movement lifts the spring 17 of the shutter wheel 18, through the release pin 15. Thus the running off of the shutter wheels 18, 23 is released, so that the curtains driven by their toothed pinions 19, 24 can run off according to the set exposure time. After exposure has been effected the pin 46 secured on the shutter wheel 23 strikes against the blocking arm 45 and moves the blocking lever 43 connected therewith out of the blocking position. Thus the blocking disc 38 with the cam 39 resting thereon is released, and is rotated by the action of the torsion spring 41 in the direction of the arrow shown in FIGURE 4, the cam 39 returning the mirror 3 into the view finding position blocked by the release lever 10, through the control pin 8 resting thereon, and then uncoupling itself from the mirror 3. This rotating movement is limited by the pin 42 secured on the drive wheel 26, upon which the blocking disc 38 abuts. In the following cocking movement actuated by the operating handle 31, for the shutter and film winding, the blocking disc 38 follows the pin 42 secured on the drive wheel 26 and is then blocked by the blocking lever 43, while the drive wheel 26 is rotated further until complete cocking of the shutter, which is terminated at one full revolution. Here the pin 42 secured on the drive wheel 26 at the same time tensions the torsion spring 41.

The cam 39 is provided with a catch 51 which serves as shock absorber for the mirror 3, when the latter is hinged up out of the view finding position. In this movement the control pin 8 secured on the mirror 3 slides along the oblique surface 52 associated with the catch 51, whereby the cam 39 is rotated against the action of the torsion spring 47, until at the end of this movement of the mirror the control pin 8 is grasped by the catch 51. Thus an impact absorption and halting of the mirror 3 are achieved in reliable fashion.

Figure 5:
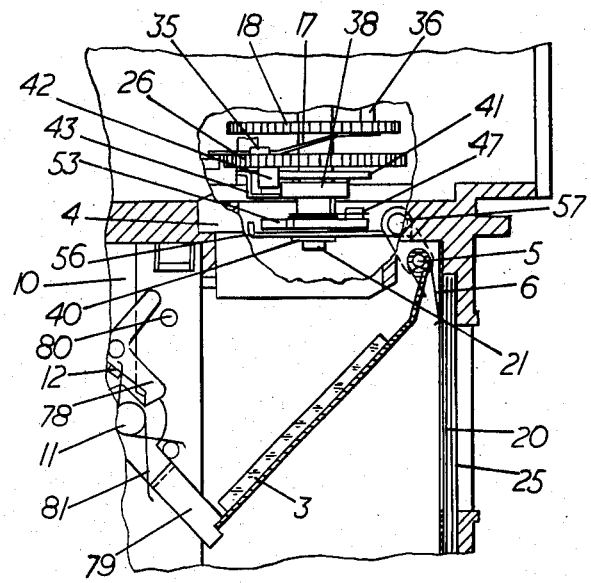
FIGURE 5 shows an embodiment according to FIGURE 1, with the difference that a radial cam is provided for the mirror control.
Figure 6:
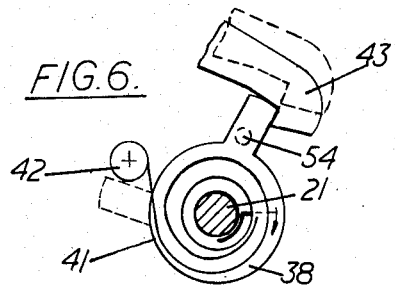
FIGURES 6 and 7 show details thereof in enlarged representation.
Figure 7:
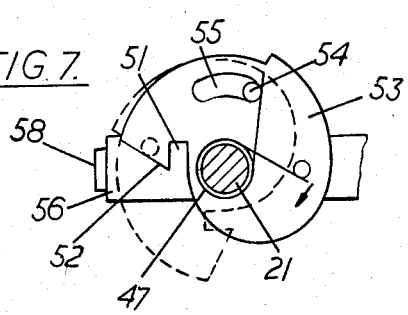

According to FIGURES 5 to 7 an example of embodiment is shown wherein the mirror control is not effected by an axial helical cam but by a radial cam. Here the already explained style of construction of a camera according to FIGURES 1 to 4 is used as basis, so that the description can be limited to the modified mirror control arrangement.

According to this, to the drive wheel 26 there is coaxially allocated a blocking disc 38, which is subject to the action of a torsion spring 41, the other arm of which abuts on the pin 42 of the drive wheel 26. The running off of the blocking disc is here blocked by the blocking lever 43, which is released by the running-off shutter after exposure is effected. The radial cam 53 here provided is allocated coaxially to the drive wheel 26 and its connection with the blocking disc 38 takes place through a pin 54 secured thereto, which extends through a central slot 55 of the radial cam 53 and rests thereon due to the action of a torsion spring 47. After release has been effected by the blocking lever 43 the blocking disc 38 is rotated in relation to the drive wheel 26 by the action of the torsion spring 41, and the radial cam 53 is entrained therewith, this cam here moving the mirror 3 back into the view finding position, through a slider 56 connected with the mirror 3 through a joint 57. The radial cam 53 is further provided with a catch 51, in which the slider 56 engages with its bent-over end 58, when the mirror 3 is hinged up. In this movement the slider end 58 slides along the inclined surface 52 and the spring 47 here permits deviation of the radial cam. After release thereof has been effected the individual parts assume the position illustrated in chain lines in FIGURES 6 and 7.

The example of embodiment as illustrated in FIGURES 8 to 12 shows the mirror control arrangement in accordance with the invention by means of an axial cam in the case of a monocular mirror reflex camera with between-the-lens shutter. Here the same reference number has been selected for all parts if they agree in principle and in relation to their functions with the parts already explained in FIGURES 1 to 7, so that it is possible to dispense with a repeated description of these parts and their functions.

According to the examples of embodiment according to FIGURES 8 to 11, to the picture-taking objective lens 2 provided on the front of the camera housing 1 there is allocated a between-the-lens shutter, of which only a control ring 59 with its return spring is illustrated diagrammatically, which ring in its movement causes the opening and closing of the shutter blades and the cocking of the shutter. This is effected in the cocking movement of the operating handle 31 by the toothed wheels 30, 26, 29 driven here through the drive pawl 32 and the winding wheel 33, namely through the toothed wheel 63 connected with the toothed wheel 29 by a shaft 62, with which toothed wheel 63 there engages a slider 64. The latter is movable in a slot guide 65 and possesses a control pin 66, which in the cocking movement actuates the control ring 59 and thereby cocks the shutter. In this position the control ring 59 is blocked by the release lever 10, co-operating with its plate 67 bent off at right angles, by means of the blocking nose 68. The construction is here so adapted that the release lever 10 actuated by the release knob 9, through its blocking nose 68, firstly releases the control ring 59 and releases the mirror 3 later in time. The control ring 59 in its running off firstly causes the closing of the shutter blades, which were opened for the purpose of viewing through the view finder. Thereupon the further running off movement of the control ring 59 is blocked by a blocking lever 70 co-operating with its bent-off edge 67, which lever is connected through a shaft 72 movable in the bearing 71 with an angle arm 73. After its release the mirror 3 in the hinging up, at the end of this movement, strikes upon the angle arm 73, and the lever 70 connected therewith thereby releases the control ring 59 for further running off, which ring here causes the opening and closing of the shutter blades for the exposure, according to the set time. After exposure is effected the control ring 59 in the remainder of its running off, through a cam 74 actuates the blocking lever 43 pivotable about the stationary bolt 44, which lever thereby releases the blocking disc 38 for running off. The latter then in turn, in combination with the axial cam 39, moves the mirror 3 back into the view finding position, lockable by the release lever 10. Otherwise the control arrangement, consisting essentially of the blocking disc 38, the torsion spring 41 and the axial cam 39 and rotatably mounted about the drive mechanism spindle 21, for the mirror 3, corresponds in relation to the construction and manner of operation with the example of embodiment according to FIGURES 1 to 4 as already explained. Here in place of an axial cam 39 for the mirror control it is also possible for a radial cam to be provided according to the example of embodiment as shown in FIGURES 5 to 7.

In departure from the explained examples of embodiment, wherein the release lever 10 connected with the release knob 9 of the camera directly blocks the mirror 3 in the view finding position and releases it therefrom, FIGURE 12 shows an example of embodiment wherein the release of the mirror 3 out of the view finding position is effected by the running off of the shutter. Here the release lever 10 merely releases the running off of the control ring 59, with its blocking nose 10, which ring then closes the shutter blades, which were opened for the purpose of viewing through the view finder, and here, through the plate 67 bent over at right angles, moves out of the blocking position a blocking lever 75 holding the mirror 3 in the view finding position and mounted under spring action 76 about the bolt 77. Here the release sequence is so adapted that the control ring 59 first closes the shutter blades and thereupon releases the mirror 3 out of the viewfinding position, through the blocking lever 75.

So that even in the case of relatively long-lasting release pressure upon the release knob 9 a blocking of the mirror 3 is ensured at the right time after its return into the view finding position, with the release lever 10 there is associated a drive pawl 78 movably mounted thereon, as shown in FIGURES 1, 5, 8. This pawl in the release movement entrains the blocking arm 79 movable about the bearing 11, which arm thereby releases the mirror 3 out of the view finding position. At the end of the release movement the drive pawl 78 with its angle arm strikes upon the stationary pin 80 and releases the blocking arm 79, which then in turn returns into the blocking position due to the action of the spring 81. In the case of the example of embodiment according to FIGURE 12 to the blocking lever 75 actuated by the control ring 59 of the shutter there is allocated the drive pawl 78. The latter here moves the blocking arm 79, pivotable about the bearing 11, out of the blocking position holding the mirror 3 fast. Thereupon the drive pawl 78 is uncoupled by the pin 80 from the blocking arm 79, so that the latter returns into the blocking position due to the action of the spring 81. In this manner in all examples of embodiment the object is achieved that even in the case of relatively long-lasting release pressure and on release by the shutter the mirror 3 returned into the view finding position is reliably blocked.

From all the explained examples of embodiment it may be seen that the construction of the mirror control arrangement in accoradnce with the invention provides the advantage of simple style of construction and reliable manner of operation both for monocular mirror reflex cameras with roller blind shutter and also for monocular mirror reflex cameras with between-the-lens shutter.

We claim:

1. In a photographic monocular mirror reflex camera having a housing, an objective lens and view-finder device arranged in the housing, a shutter device, roll-film support means, cocking and film winding mechanism in the housing operatively connected to said shutter device and said support means for simultaneous cocking of said shutter device and film-winding, a reflex mirror pivotally mounted in the housing and movable between a first position where it lies in the optical path between the lens and the film in order to reflect the image into the view-finder device and a second position where the mirror is clear of said optical path during picture-taking, first spring means for biasing said mirror towards its second position, said shutter device including a shutter, a driving wheel, transmission means connected between said driving wheel and said shutter, and shutter release mechanism, the provision of a blocking disc in the housing arranged coaxially with said driving wheel, a cam disc coupled with said blocking disc, a cam surface on said disc, a cam follower provided on said mirror and capable of engagement with said cam surface to be driven thereby on the rotation of the cam disc to effect movement of said mirror into the first position thereof, a blocking lever pivotally mounted in the housing and releasably engageable with said blocking disc to prevent movement of the blocking disc and the cam disc, means provided on said shutter device capable of engaging said blocking lever to release the blocking disc on the actuation of said shutter device, second spring means connected to said cam disc for effecting drive of the latter when the blocking lever is disengaged from the blocking disc, which second spring means as capable of being loaded by said driving wheel during cocking of the shutter device whilst the blocking lever is in engagement with the blocking disc, a further blocking lever pivotally mounted in the housing and movable into one position where it engages the mirror to arrest the latter against the action of said first spring means in the first position thereof and into a second position where it is disengaged from said mirror to effect release thereof, and means operatively connected between said release mechanism and said further blocking member for moving the latter into its second position.

2. In a photographic monocular mirror reflex camera having a housing, an objective lens and view-finder device arranged in the housing, a shutter device, roll-film support means, cocking and film winding mechanism in the housing operatively connected to said shutter device and said support means for simultaneous cocking of said shutter device and film-winding, a reflex mirror pivotally mounted in the housing and movable between a first position where it lies in the optical path between the lens and the film in order to reflect the image into the view-finder device and a second position where the mirror is clear of said optical path during picture-taking, first spring means for biasing said mirror towards its second position, said shutter device including a shutter, a driving wheel, transmission means connected between said driving wheel and said shutter, and shutter release mechanism, the provision of a blocking disc in the housing arranged coaxially with said driving wheel, a cam disc coupled with said blocking disc, a cam surface on said disc, a cam follower provided on said mirror and capable of engagement with said cam surface to be driven thereby on the rotation of the cam disc to effect movement of said mirror into the first position thereof, a blocking lever pivotally mounted in the housing and releasably engageable with said blocking disc to prevent movement of the blocking disc and the cam disc, means provided on said shutter device capable of engaging said blocking lever to release the blocking disc on the actuation of said shutter device, second spring means in the form of a torsion spring mounted coaxially with said driving wheel and connected between said driving wheel and said cam disc for effecting drive of the latter when the blocking lever is disengaged from the blocking disc, which second spring means is capable of being loaded by said driving wheel during cocking of the shutter device whilst the blocking lever is in engagement with the blocking disc, a further blocking lever pivotally mounted in the housing and movable into one position where it engages the mirror to arrest the latter against the action of said first spring means in the first position thereof and into a second position where it is disengaged from said mirror to effect release thereof, and means operatively connected between said release mechanism and said further blocking member for moving the latter into its second position.

3. In a photographic monocular mirror reflex camera having a housing, an objective lens and view-finder device arranged in the housing, a shutter device, roll-film support means, cocking and film winding mechanism in the housing operatively connected to said shutter device and said support means for simultaneous cocking of said shutter device and film-winding, a reflex mirror pivotally mounted in the housing and movable between a first position where it lies in the optical path between the lens and the film in order to reflect the image into the view-finder device and a second position where the mirror is clear of said optical path during picture-taking, first spring means for biasing said mirror towards its second position, said shutter device including a shutter, a driving wheel, transmission means connected between said driving wheel and said shutter, and shutter release mechanism, the provision of a blocking disc in the housing arranged coaxially with said driving wheel, a cam disc arranged coaxially with said blocking disc, a first projection provided on said blocking disc, a second projection provided on said cam disc, coupling means in the form of a torsion spring arranged between said cam disc and said blocking disc and urging said second projection into engagement with said first projection, a cam surface on said disc, a cam follower provided on said mirror and capable of engagement with said cam surface to be driven thereby on the rotation of the cam disc to effect movement of said mirror into the first position thereof, a blocking lever pivotally mounted in the housing and releasably engageable with said blocking disc to prevent movement of the blocking disc and the cam disc, means provided on said shutter device capable of engaging said blocking lever to release the blocking disc on the actuation of said shutter device, second spring means connected to said cam disc for effecting drive of the latter when the blocking lever is disengaged from the blocking disc, which second spring means is capable of being loaded by said driving wheel during cocking of the shutter device whilst the blocking lever is in engagement with the blocking disc, a further blocking lever pivotally mounted in the housing and movable into one position where it engages the mirror to arrest the latter against the action of said first spring means in the first position thereof and into a second position where it is disengaged from said mirror to effect release thereof, and means operatively connected between said release mechanism and said further blocking member for moving the latter into its second position.

4. A monocular mirror reflex camera according to claim 3, wherein the torsion spring is housed in a cylindrical recess provided in said cam disc.

5. A monocular mirror reflex camera according to claim 2, wherein a stop member is provided on said driving wheel which stop member bears against one end of the second spring means to load the latter on rotation of said driving wheel, and a projection is provided on said blocking disc and is capable of engagement with said stop member to limit the rotational movement of said blocking disc and the cam disc.

6. A monocular mirror reflex camera according to claim 1, wherein a projection is provided on the transmission means and is engageable with said blocking lever to pivot the latter out of engagement with the blocking disc after an exposure has been effected.

7. A monocular mirror reflex camera according to claim 1, wherein third spring means are provided to urge said further blocking member into its first position, and said means operatively connected between said release mechanism and said further blocking member comprises an intermediate lever pivotally mounted in the housing, and capable of being moved by said release mechanism, a bell-crank lever pivotally mounted on said intermediate lever, one of the arms of said bell-crank lever having a nose cooperable with a recess provided in said blocking lever so as to drive said further blocking lever into its second position on movement of said intermediate lever, and a pin on said housing against which the other arm of said bell-crank lever engages after a predetermined movement of said intermediate lever in order to rotate said bell-crank lever to a position where said nose disengages the recess in the further blocking lever to allow the latter to return to its first position.

8. A monocular mirror reflex camera according to claim 1, wherein shutter blocking means are provided in the housing which blocking means are capable of arresting said transmission means, and which are operable by said mirror when the latter moves into its second position in order to release the transmission means to thereby effect an exposure.

References Cited in the file of this patent
UNITED STATES PATENTS
2,997,934   Heerklotz _____ Aug. 29, 1961